United States Patent Office 2,855,276
Patented Oct. 7, 1958

2,855,276

RECOVERY OF BORIC ACID FROM CRUDE BORATE ORES

Frank H. May and Vladimir V. Levasheff, Whittier, Calif., assignors to Callery Chemical Company, Pittsburgh, Pa., a corporation of Pennsylvania No Drawing. Application October 20, 1954
Serial No. 463,628

4 Claims. (Cl. 23—149)

This invention relates to a method for recovering boric acid from crude calcium borate ores such as colemanite.

Colemanite ($Ca_2B_6O_{11} \cdot 5H_2O$) exists in nature as a crude ore combined with calcium carbonate and other insoluble matter, principally silica insoluble metal salts. It is a valuable starting material for the preparation of boron compounds provided the boron can be isolated in a more usable form such as boric oxide or boric acid.

It is an object of this invention to provide a method for preparing boric acid from colemanite or other calcium borate ores.

Another object is to provide a method for treating colemanite or other calcium borate ores with hydrochloric acid of a predetermined concentration whereby calcium chloride is removed in solution and a solid residue of boric acid is recovered.

Other objects of this invention will become apparent as described in the specification and claims hereinafter related.

This process will be described more fully in the specification and the novelty thereof will be particularly pointed out and distinctly claimed.

This invention is based on the discovery that the solubility of boric acid in an aqueous solution of calcium chloride is at a minimum in the calcium chloride concentration range of 40 to 75 g. per 100 g. of water. By taking advantage of this lowered solubility, it is possible to carry out an acid digestion of the crude colemanite ore in such a way as to produce a crop of solid boric acid and separate substantially all of the calcium as calcium chloride. Thus if the concentration of the hydrochloric acid is maintained at a value so that the sum of the water in the acid, the water of hydration, and the water of reaction will produce a solution containing 40 to 75 g. $CaCl_2$ per 100 g. of water, the calcium may be removed from the ore in the form of a $CaCl_2$ solution without dissolving an appreciable amount of the boric acid formed.

The following table shows the solubility of boric acid in calcium chloride solutions at various temperatures, as determined experimentally.

| g. $CaCl_2$ per 100 g. $H_2O$ | g. $H_3BO_3$ per 100 g. $H_2O$ at Various Temperatures | | | | | |
|---|---|---|---|---|---|---|
| | 30° C. | 40° C. | 50° C. | 60° C. | 70° C. | 80° C. |
| 0.0 | 6.7 | 8.7 | 11.5 | 14.8 | 18.6 | 23.6 |
| 4.8 | 5.9 | 7.9 | 10.3 | 13.4 | 17.3 | 22.1 |
| 15.0 | 4.4 | 5.9 | 7.8 | 10.2 | 13.3 | |
| 28.7 | | 4.7 | 6.3 | 8.5 | 11.3 | 15.1 |
| 42.0 | 3.0 | 4.2 | 5.6 | 7.5 | 9.7 | 13.7 |
| 56.2 | 2.8 | 3.8 | 5.2 | 7.0 | 9.1 | 12.0 |
| 71.0 | 3.4 | 4.3 | 5.5 | 7.3 | 9.6 | 11.5 |
| 108.3 | | | 5.7 | 7.0 | 9.0 | 11.5 | 14.1 |
| 130.0 | | | | 9.2 | 10.9 | 13.7 | 17.1 |

It is apparent from this data that the solubility of boric acid is at a minimum when calcium chloride is present in a concentration of about 40 to 75 g. per 100 g. of water. Beyond this range the solubility of boric acid increases substantially.

In one experiment 2000 g. of crude colemanite ore which analyzed 1486 g. colemanite, 206 g. calcium carbonate and 308 g. insoluble matter was treated with concentrated hydrochloric acid containing 677 g. HCl dissolved in 1777 g. of water in a suitable digestor heated to 80° C. At this stage the following reactions occurred:

$$Ca_2B_6O_{11} \cdot 5H_2O + 4HCl2H_2O \rightarrow 2CaCl_2 + 6H_3BO_3; \ CaCO_3 + 2HCl \rightarrow CaCl_2 + H_2O + CO_2.$$

In this reaction 91 g. of carbon dioxide were evolved and the remaining solution was filtered. The undiluted filtrate which analyzed 76 g. boric acid, 1011 g. calcium chloride and 1971 g. water was discarded. The solids remaining on the filter consisted of boric acid and the insoluble contaminants from the ore. These solids were then washed with cold water, passed into a repulper where they were treated with hot water and refiltered. The filtrate analyzed 1264 g. boric acid, 19 g. calcium chloride and the balance was water. The insoluble matter remaining on the filter consisted of the contaminants from the ore and weighed 308 g. This concentrated boric acid filtrate may be used as a feed for producing other boron containing compounds or it can be further concentrated and solid boric acid crystallized therefrom. It should be pointed out that in this process an excess of acid should be avoided to avoid dissolving the otherwise insoluble impurities and contaminating the boric acid.

Although colemanite ore was used in the experiments described it will be apparent to those skilled in the art that any similar calcium borate ore may be used as the raw material. It should also be noted that while this process was carried out at 80° C. other data show that the process is operative at temperatures as low as 30° C. and as high as 100° C. At temperatures above 100° C. the solubility of boric acid is excessive and it becomes more difficult to separate the boric acid without excessive losses in solution.

It is to be understood that within the scope of the claims appended hereto this invention may be practiced otherwise than as specifically described.

Having thus described this invention and the manner in which it is to be performed, what is desired to be claimed and secured by Letters Patent of the United States is:

1. A method of preparing boric acid from a calcium borate ore which comprises treating the ore at a temperature of at least 30° C. with a stoichiometric amount of hydrochloric acid of a concentration sufficient to form boric acid and a solution of 40 to 75 g. calcium chloride per 100 g. of water, and separating the calcium chloride solution from the solid boric acid formed.

2. A method according to claim 1 in which the borate ore contains colemanite.

3. A method according to claim 1 which is carried out at a temperature of 30°–100° C.

4. A method according to claim 1 in which the solid boric acid is dissolved in water and filtered to remove insoluble mineral impurities.

References Cited in the file of this patent

UNITED STATES PATENTS

| 1,259,718 | Blumenberg | Mar. 19, 1918 |
| 2,531,182 | Wiseman | Nov. 21, 1950 |

FOREIGN PATENTS

| 20,384 | Great Britain | of 1899 |

OTHER REFERENCES

Seidell: "Solubilities of Inorganic and Organic Compounds," vol. 2 pp. 1116–1118 (1928). D. Van Nostrand & Co., New York City.